(12) United States Patent
Teoh

(10) Patent No.: US 9,739,495 B2
(45) Date of Patent: Aug. 22, 2017

(54) COAXIAL VENTILATOR

(71) Applicant: Siang Teik Teoh, Selangor (MY)

(72) Inventor: Siang Teik Teoh, Selangor (MY)

( * ) Notice: Subject to any disclaimer, the term of this patent is extended or adjusted under 35 U.S.C. 154(b) by 79 days.

(21) Appl. No.: 14/391,387

(22) PCT Filed: Apr. 4, 2014

(86) PCT No.: PCT/US2014/033101
§ 371 (c)(1),
(2) Date: Oct. 8, 2014

(87) PCT Pub. No.: WO2014/165835
PCT Pub. Date: Oct. 9, 2014

(65) Prior Publication Data
US 2015/0292761 A1    Oct. 15, 2015

Related U.S. Application Data

(60) Provisional application No. 61/809,292, filed on Apr. 5, 2013, provisional application No. 61/991,436, filed on May 9, 2014.

(51) Int. Cl.
*F24F 7/02* (2006.01)
*F24F 12/00* (2006.01)
*F24F 5/00* (2006.01)

(52) U.S. Cl.
CPC .............. *F24F 7/02* (2013.01); *F24F 5/0035* (2013.01); *F24F 12/006* (2013.01); *Y02B 30/563* (2013.01)

(58) Field of Classification Search
CPC .... F24F 7/02; F24F 5/0035; F24F 7/00; F24F 12/006

USPC .......................................................... 454/242
See application file for complete search history.

(56) References Cited

U.S. PATENT DOCUMENTS

| | | | | |
|---|---|---|---|---|
| 61,820 | A * | 2/1867 | Estes ......................... | F24F 7/02 454/250 |
| 424,778 | A * | 4/1890 | Gee ........................... | F24F 7/00 126/85 B |
| 992,581 | A | 5/1911 | Noonan et al. | |
| 1,254,643 | A * | 1/1918 | Akerlund .................. | F24D 5/04 237/48 |
| 1,689,246 | A * | 10/1928 | Knapen ..................... | F24F 7/00 454/1 |
| 1,690,905 | A * | 11/1928 | McDevitt .................. | F24F 7/00 454/250 |
| 2,203,590 | A | 6/1940 | Bock | |
| 2,277,982 | A * | 3/1942 | Hosbein .................... | F24F 7/02 454/368 |

(Continued)

*Primary Examiner* — Steven B McAllister
*Assistant Examiner* — Jonathan Cotov
(74) *Attorney, Agent, or Firm* — Abraham-Morgan, LLC

(57) ABSTRACT

A coaxial ventilator (20) exchanges atmosphere between parts of a building (22) that are at differing heights. The coaxial ventilator (20) includes an outer conduit (24) that extends from an upper end (42) thereof downward to a lower end (44) thereof. The outer conduit (24) surrounds an inner conduit (62) that extends substantially the entire length of the outer conduit (24). Both the outer and inner conduits (24, 62) are open at their respective upper ends (42, 66) and lower ends (44, 68). Temperatures of atmosphere both surrounding and within the outer conduit (24) and the inner conduit (62) induce an exchange of atmosphere between the coaxial ventilator (20) and surrounding atmosphere.

19 Claims, 13 Drawing Sheets

(56) References Cited

U.S. PATENT DOCUMENTS

| | | | | | |
|---|---|---|---|---|---|
| 2,856,837 | A | * | 10/1958 | Thulman | F23J 11/00 126/307 R |
| 2,916,983 | A | * | 12/1959 | Kinkead | F23J 13/025 126/307 R |
| 3,315,586 | A | * | 4/1967 | Marrapese | F23L 17/04 126/307 R |
| 3,361,051 | A | * | 1/1968 | Fair | F23L 17/04 126/307 A |
| 3,815,478 | A | | 6/1974 | Teodorescu et al. | |
| 4,530,273 | A | * | 7/1985 | Smith | E04D 13/17 454/339 |
| 5,000,081 | A | * | 3/1991 | Gilmer | F24F 7/08 165/54 |
| 5,722,483 | A | * | 3/1998 | Gibson | F24F 3/044 165/54 |
| 5,934,993 | A | * | 8/1999 | Maruyama | F24F 7/06 454/237 |
| 6,289,886 | B1 | * | 9/2001 | Radke | F24C 15/002 126/307 A |
| 7,818,928 | B2 | * | 10/2010 | Brunt | F23J 13/04 52/169.5 |
| 9,003,717 | B2 | * | 4/2015 | Barre | F24F 7/02 52/198 |
| 9,086,222 | B2 | * | 7/2015 | Tai | F24F 7/04 |
| 2010/0090469 | A1 | | 4/2010 | Sullivan | |
| 2012/0280503 | A1 | * | 11/2012 | Mahawili | F03D 9/00 290/52 |

\* cited by examiner

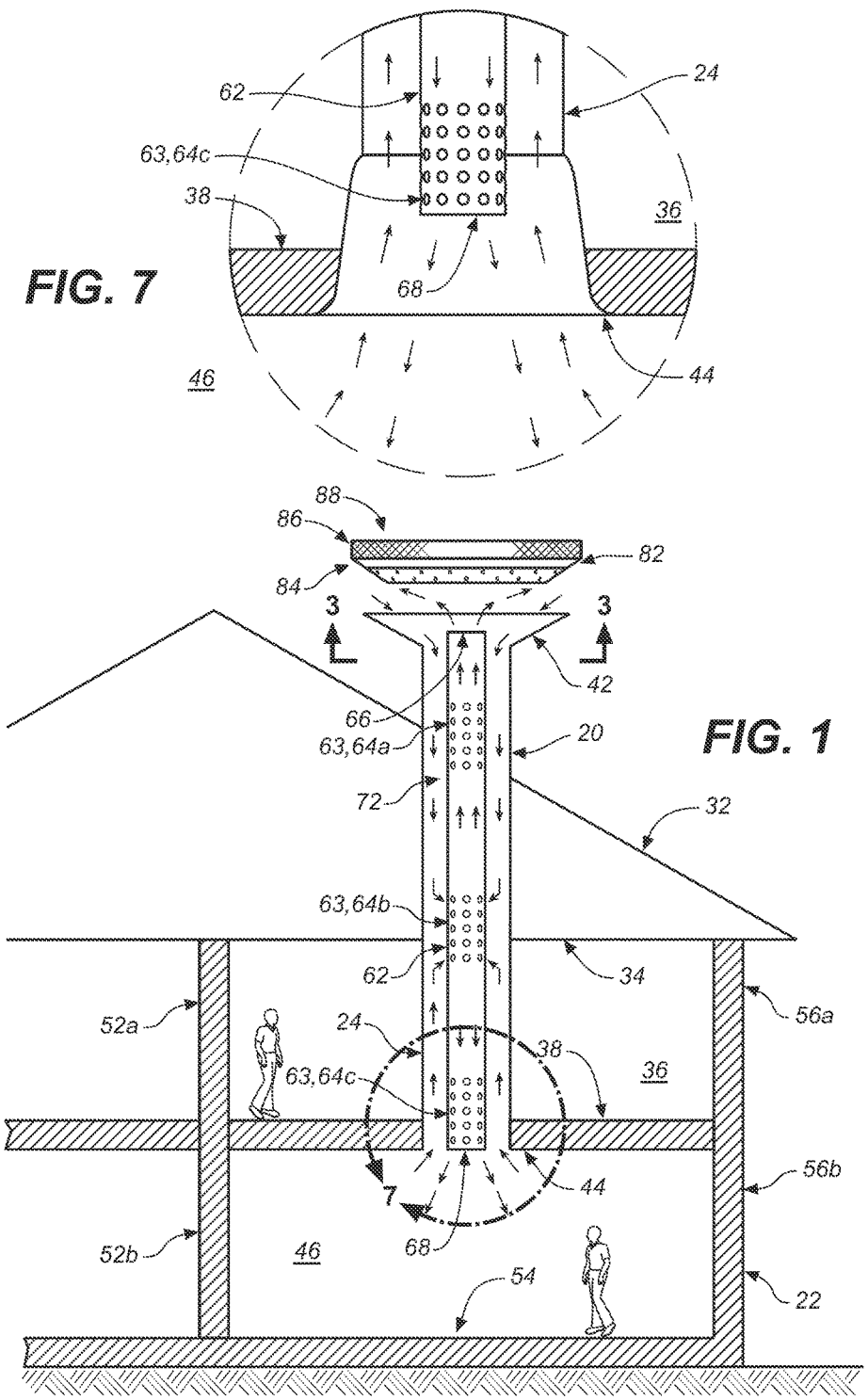

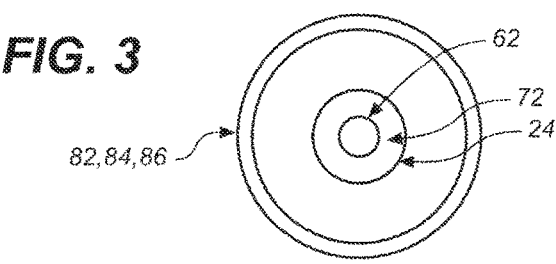
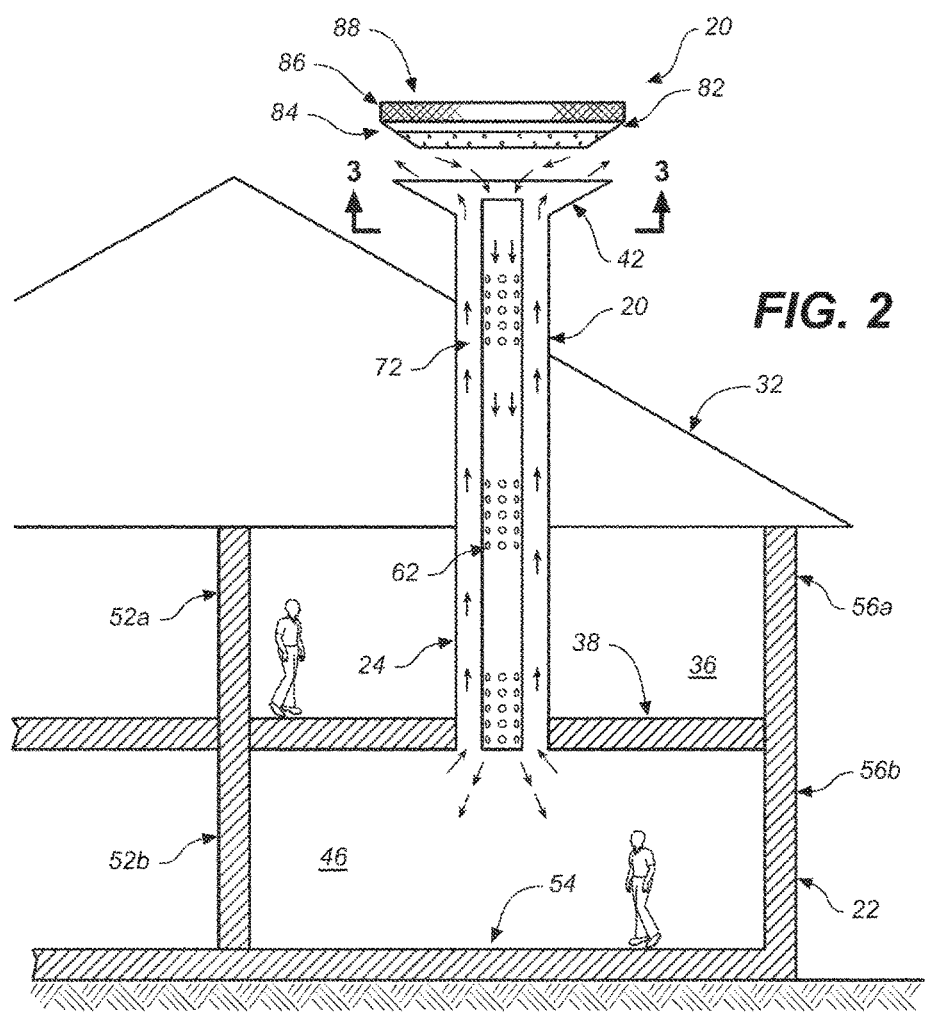

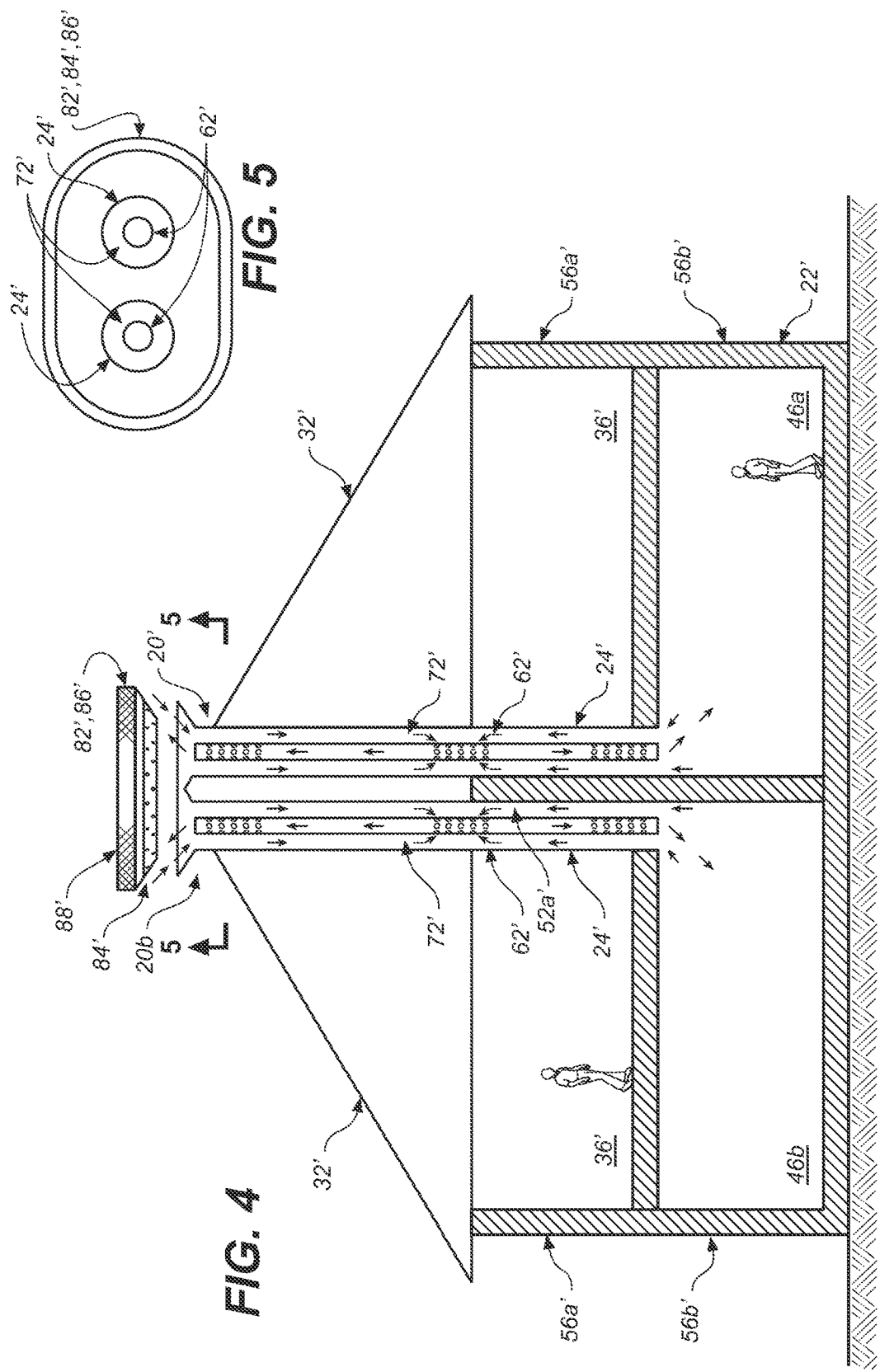

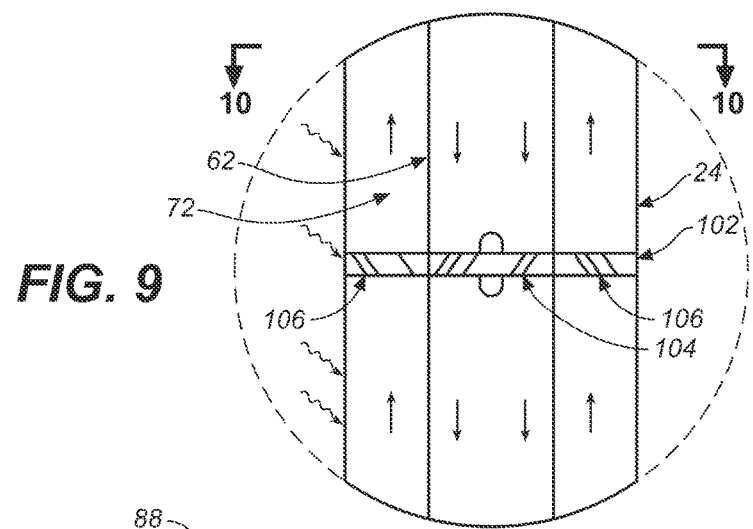
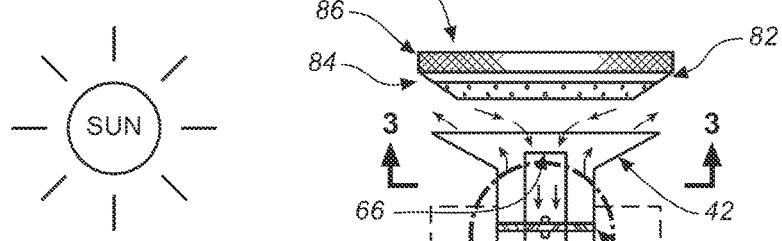
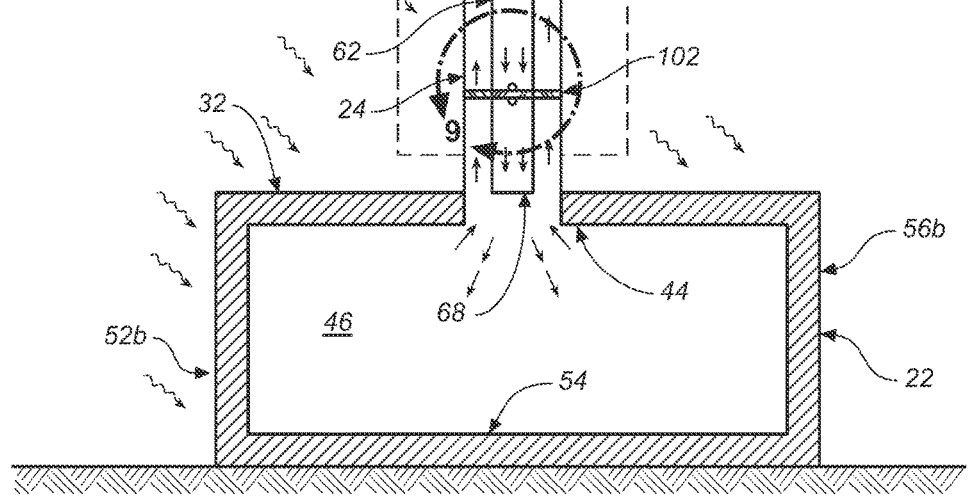

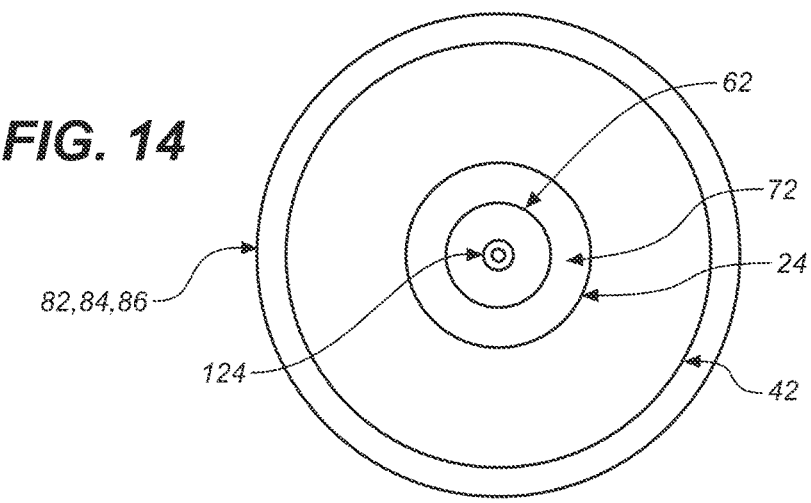
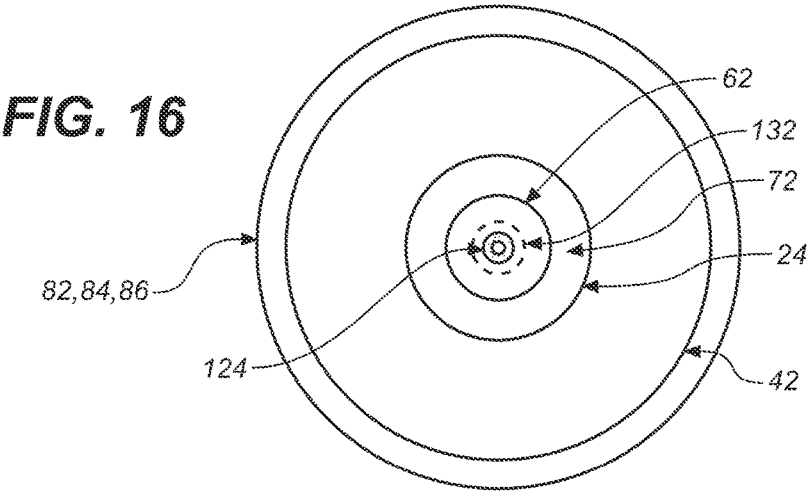
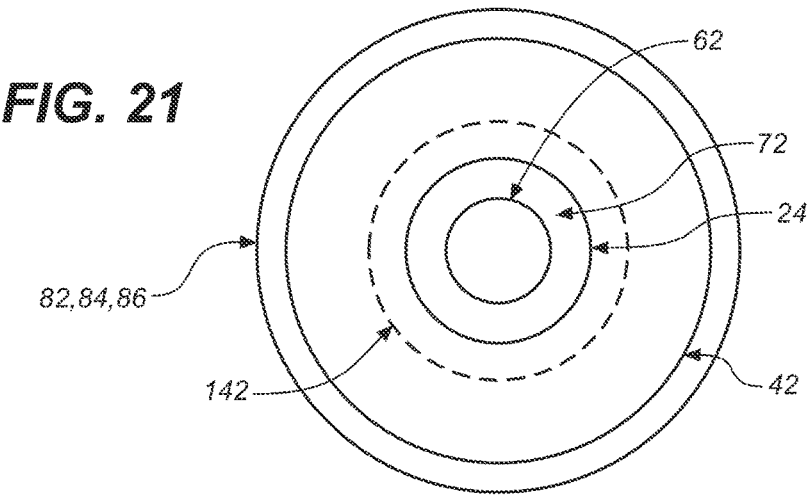

COAXIAL VENTILATOR

CROSS REFERENCE(S) TO RELATED APPLICATION(S)

This patent application claims priority under 35 U.S.C. §371 from Patent Cooperation Treaty ("PCT") International Patent Application PCT/US2014/033101 entitled "Coaxial Ventilator" that was filed with the United States Patent and Trademark Office ("USPTO") on Apr. 4, 2014, claiming the benefit of United States Provisional Patent Application Ser. No. 61/809,292 entitled "Coaxial Ventilator" that was filed with the USPTO on Apr. 5, 2013.

This patent application also claims the benefit of U.S. Provisional Patent Application Ser. No. 61/991,436 entitled "Coaxial Ventilator" that was filed with the USPTO on May 9, 2014.

BACKGROUND

Technical Field

The present disclosure relates generally to building ventilation and, more particularly, to a ventilation system that exploits a temperature difference between a building's interior and the surrounding atmosphere.

Background Art

Using gravity for moving heating, circulating and ventilating air is a simple technique that has been a well understood and practiced for more than 100 years. Hot air is less dense than cold air and will therefore tend to rise while cooler air tends to settle. However, the force produced in this way is very slight, and is easily overcome by friction in ducts and by wind pressure around a building. A gravity ventilation system is simpler than a forced air system, requires no skilled attention, and is less expensive to install. Widespread use of gravity heating air and water systems ended mainly because such systems:

1. were difficult to install requiring large ducts and many penetrations through floor slabs etc.; and
2. their installation required experienced engineers who could assess a building's suitability for a gravity heating systems.

Historically, the advantages of gravity heating and circulation made it particularly advantageous for houses, small school buildings, churches, halls, etc., where a heat source may be placed near the bases of a warm air duct and where air flow resistance is low. However, unseparated air ducts in a gravity ventilation system often become inefficient due to stagnation if the duct's wall becomes exposed to cooler surrounding or adjacent air that induces downdrafts within the duct which collide with rising warmer air. Gravity air ducts that allow air to circulate simultaneously in opposite directions require very large cross-sections like an air well in multistory buildings. Also, it has been thought that using gravity for ventilation is more expensive than a fan because the amount of thermal energy required to produce a significant draft or air velocity through a duct greatly exceeds the electrical energy required to power a fan. Gravity air circulation may exhibit difficulty in moving hot air into certain rooms in a building during windy weather.

BRIEF SUMMARY

The present disclosure provides an improved ventilation duct.

An object of the present disclosure is to provide a gravity ventilation duct that is smaller than conventional gravity ventilation ducts.

Another object of the present disclosure is to provide a gravity ventilation duct that does not require a separate return duct.

Another object of the present disclosure is to provide a gravity ventilation duct that is easier to position within a building and easier to install.

Another object of the present disclosure is to provide a gravity ventilation duct that requires only a single penetration through a building's floor/ceiling.

Another object of the present disclosure is to provide a gravity ventilation duct that avoids air flow stagnation.

Another object of the present disclosure is to provide a gravity ventilation duct that circulates air efficiently over longer lengths.

Another object of the present disclosure is to provide a gravity ventilation duct that is smaller and that uses duct cross-sectional area efficiently.

While the improved gravity ventilation duct is disclosed in the context of being installed in a building, the coaxial ventilator is also useful for ventilating tunnels, underground shelters, mineshafts, and the like.

Another object of the present disclosure is using passive evaporative cooling both throughout the day and especially at night.

Another object of the present disclosure is providing an improved thermal storage of nighttime "coolness" with enlarged heat and/or cool storage capacity.

Another object of the present disclosure is increasing the cooling capability of the coaxial ventilator without substantially increasing the physical fluid capacity.

Another object of the present disclosure is providing a passive, small sized, unobtrusive cooling or heating ventilator where the cooling or heating apparatus does not intrude into the space to be cooled or heated.

Another object of the present disclosure is collecting rainwater for use in evaporative cooling.

Another advantage of the present disclosure is that in one alternative embodiment it allows drawing via a drain tap collected rainwater as a backup for supplementary or emergency domestic water supply.

Another advantage of the present disclosure is that where in one alternative embodiment where the water pan is filled from the Municipal Water Mains thru a Float Valve (not illustrated in any of the FIGs.), the present disclosure essentially combines the functions of a domestic water reservoir tank and a building cooler into one compact cost efficient device.

The disclosed coaxial ventilator is adapted for inclusion in a building for exchanging atmosphere between parts of the building at differing heights. The coaxial ventilator includes an outer conduit adapted for being juxtaposed with at least a portion the building selected from a group consisting of:

1. a roof;
2. a floor; and
3. a wall.

The outer conduit has a length that extends from an upper end thereof downward to a lower end thereof.

The coaxial ventilator also includes an inner conduit that is surrounded by the outer conduit, and extends substantially along the entire length of the outer conduit. Accordingly, an upper end and a lower end of the inner conduit are located near the upper end and lower end of the outer conduit.

Both the outer conduit and the inner conduit are open at the respective upper ends and lower ends thereof. Responsive to temperatures of atmosphere both surrounding and within the outer conduit and the inner conduit simultaneously:

1. atmosphere about the upper end of the outer conduit enters into one (1) of two (2) conduits selected from a group consisting of:
   a. the outer conduit; and
   b. the inner conduit; and
2. atmosphere within the coaxial ventilator exits into atmosphere about the upper end of the outer conduit from one (1) of two (2) conduits selected from a group consisting of:
   a. the inner conduit; and
   b. the outer conduit.

While the improved gravity ventilation duct is disclosed in the context of being installed in a building, the coaxial ventilator is also useful for ventilating tunnels, underground shelters, mineshafts, and the like.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a cross-sectional, elevational view depicting a building having a coaxial ventilator in accordance with the present disclosure included therein illustrating the ventilator's nighttime operation in warm climate for transferring cooler air from outside a building into a lower room within the building;

FIG. 2 depicts the building of FIG. 1 illustrating day time operation of the coaxial ventilator in warm climate;

FIG. 3 is a cross-sectional plan view of the coaxial ventilator taken along the line 3-3 respectively in FIGS. 1 and 2;

FIG. 4 is a cross-sectional, elevational view depicting a building in which an alternative embodiment pair of coaxial ventilators in accordance with the present disclosure ventilate two (2) different rooms within the building during nighttime operation in warm climate;

FIG. 5 is a cross-sectional plan view of the twin coaxial ventilators of FIG. 4 taken along the line 5-5 therein;

FIG. 7 is a cross-sectional elevational view of a lower end of the coaxial ventilator illustrated in FIG. 1 depicting a preferred bell shaped flaring at the lower end of the ventilator's outer conduit;

FIG. 8 is a cross-sectional elevational view of the coaxial ventilator in accordance with the present disclosure, such as the coaxial ventilator depicted in FIG. 1, that includes a pair of turbines located respectively near the top and bottom thereof;

FIG. 9 is an enlarged cross-sectional elevational view depicting in greater detail one of the turbines depicted in FIG. 8;

FIG. 14 is an enlarged cross-sectional plan view of the coaxial ventilator taken along the lines 12-12 and 14-14 respectively in FIGS. 11 and 13;

FIG. 16 is an enlarged cross-sectional plan view of the coaxial ventilator taken along the line 16-16 in FIG. 15;

FIG. 21 is a cross-sectional plan view of the upper hollow collar flange taken along the line 21-21 in FIG. 20.

DETAILED DESCRIPTION

Figure 6:
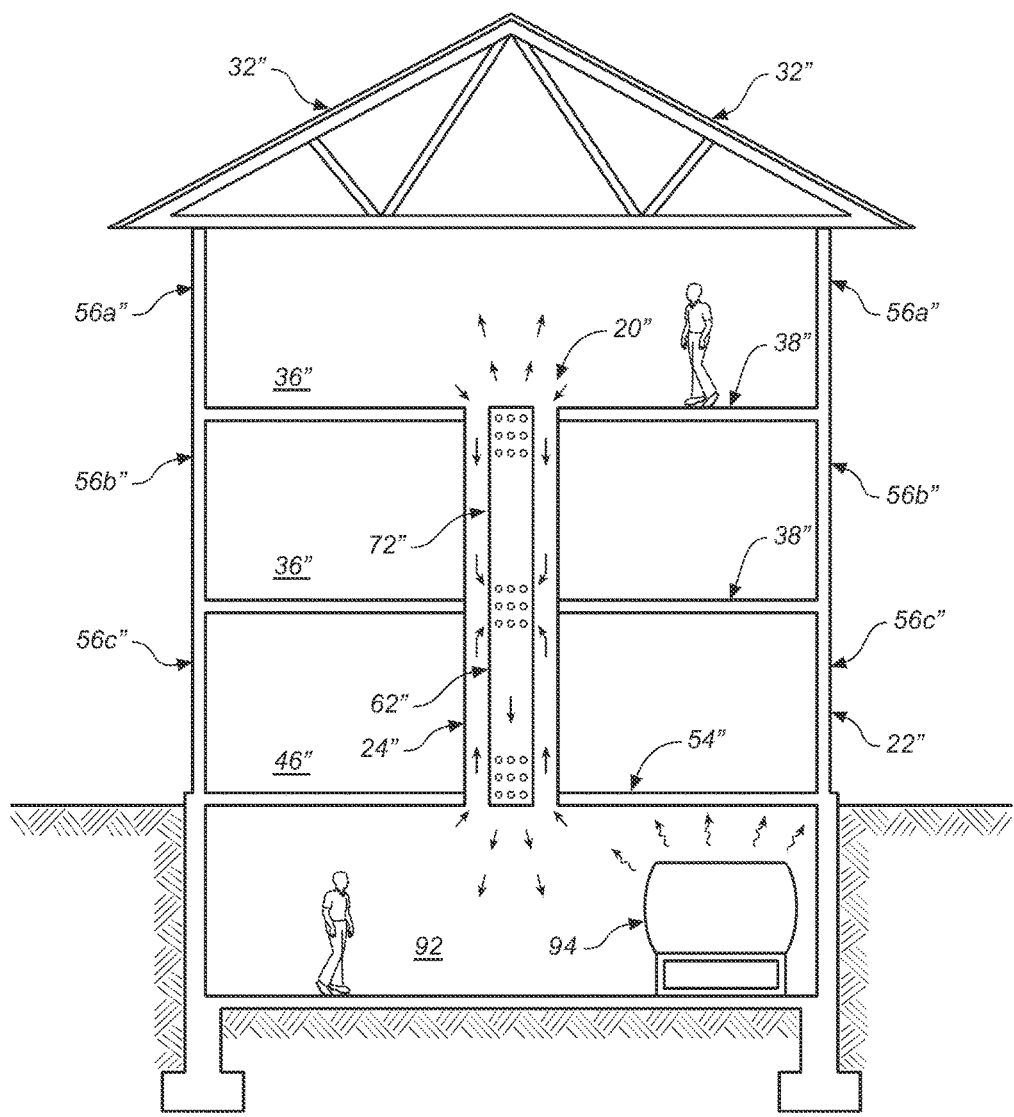
FIG. 6 is a cross-sectional, elevational view depicting yet another alternative embodiment coaxial ventilator located in a multi-story building in a cold climate for transferring warmer air from a heated room at the bottom of a building, e.g. a basement, to an upper room within the building.

FIGS. 1 and 2 depict a coaxial ventilator, identified by the general reference number 20, included in the structure of a building 22. The coaxial ventilator 20 includes an uninsulated outer conduit 24 made of a thermally conductive material that is juxtaposed with and, in the illustrations of FIGS. 1 and 2, passes through:

1. a roof 32;
2. a ceiling 34 of a warm upper story room 36; and
3. a floor 38 of the room 36.

The roof 32, the ceiling 34 and the floor 38 are all respective portions of the building 22. As depicted in FIGS. 1 and 2, the outer conduit 24 of the coaxial ventilator 20 has a length that extends from a flared upper end 42 located above the roof 32 downward to a lower end 44 that is located at a lower room 46 of the building 22 beneath the room 36. In the illustrations of FIGS. 1 and 2 the building 22 also includes:

1. an upper interior wall 52*a*;
2. a lower interior wall 52*b*;
3. a floor 54 for the room 46 for which the floor 38 of the upper room 36 also provides a ceiling;
4. an upper exterior wall 56*a*; and
5. a lower exterior wall 56*b*.

The coaxial ventilator 20 also includes an inner conduit 62 made of a thermally insulative material which may be flexible and/or corrugated that is:
1. surrounded by the outer conduit 24;
2. extends substantially along the entire length of the outer conduit 24; and
3. is pierced by a plurality of holes 63 at locations 64*a*, 64*b* and 64*c* where transitions occur in temperature about the outer conduit 24.

An upper end 66 of the inner conduit 62 is preferably located slightly below the top of the flared upper end 42 of the outer conduit 24. Preferably, a lower end 68 of the inner conduit 62 is similarly recessed slightly above the lower end 44 of the outer conduit 24. Consequently, the inner conduit 62 has a slightly shorter length than that of the outer conduit 24.

As depicted most clearly in FIG. 3, the presence of the inner conduit 62 centered within the outer conduit 24 establishes an annularly-shaped space 72 therebetween that extends along the length of the inner conduit 62. Cross-sectional areas of the inner conduit 62 and the annularly-shaped space 72 should be approximately equal with the cross-sectional area of the annularly-shaped space 72 being slightly larger to compensate for air friction with both the outer conduit 24 and the inner conduit 62.

While FIG. 3 depicts the inner conduit 62 as being centered within the outer conduit 24, that is not an essential requirement for the coaxial ventilator 20. The coaxial ventilator 20 works well if the inner conduit 62 were to be displaced to one side within the outer conduit 24. The inner conduit 62 may not be centered within the outer conduit 24 if, for example, the inner conduit 62 were loosely fixed or not secured at the very center of the outer conduit 24 perhaps to facilitate fabricating the coaxial ventilator 20 or adjustment of inner conduit 62 etc., or if at some locations within the building 22 the coaxial ventilator 20 is inclined, i.e. not vertical.

If the inner conduit 62 is insecurely positioned within the outer conduit 24 and the coaxial ventilator 20 is inclined, the inner conduit 62 may sag or hang against a lower wall of the outer conduit 24. Under such a circumstance, inner conduit 62 may contact the outer conduit 24 but because the inner conduit 62 is thermally insulated, i.e. does not conduct heat well, and contact area is small, little heat will be transferred from the outer conduit 24 to the inner conduit 62 thereby preserving a temperature difference between the outer and inner conduits 24, 62. Accordingly, the coaxial ventilator 20 works regardless of whether the inner conduit 62 is at the exact center of the outer conduit 24 or displaced to one side thereof.

In fact, displacing the inner conduit 62 greatly to one side of the outer conduit 24 lowers airflow resistance between the outer and inner conduits 24, 62. Displacing the inner conduit 62 to one side of the outer conduit 24 forces most of the airflow between the outer and inner conduits 24, 62 into a more cohesive "fat" crescent cross-sectional shape, with the major portion of the air flow occurring in the "fat" center of the crescent. If most of the air flow occurs in the "fat" center of the crescent, the air flow more nearly approximates that of an ideal circular cross-sectional shape. Approaching more nearly to an ideal circular cross-sectional air flow minimizes friction with the outer and inner conduits 24, 62 in comparison with the thinner, strictly perfectly annular shape of airflow along the annularly-shaped space 72 having the same cross-sectional area. To reduce friction due to stagnant "dead" space at the sharp "horned" ends of a crescent cross-sectional shape near where the inner conduit 62 contacts the outer conduit 24, the cross-sectional area between the outer and inner conduits 24, 62 can be increased to be slightly larger than the cross-sectional area of the inner conduit 62.

As depicted in FIG. 1, the coaxial ventilator 20 may also include a cover 82 disposed above the flared upper end 42 of the outer conduit 24. Among other functions described in greater detail below, the cover 82 occludes upper ends 42, 66 both of the outer conduit 24 and of the inner conduit 62 thereby preventing precipitation from entering thereinto.

The outer conduit 24 of the coaxial ventilator 20 is highly heat absorbent and heat radiative such as being fabricated with a matt black absorptive and radiative surface. The inner conduit 62 is preferably made of heat insulating material. A length of the coaxial ventilator 20 passing through a warmer area of the building 22, such as the room 36 in FIG. 1, is warmed thereby heating air within a segment of the annularly-shaped space 72 that spans the room 36. As depicted in FIG. 1 by small upwardly directed arrows in the annularly-shaped space 72 below the location 64*b*, warmer air within the annularly-shaped space 72 spanning the room 36 rises while cooler air within a segment of the inner conduit 62 spanning the room 36 descends. Above a zone in which a transition in temperature about the outer conduit 24 occurs, such as that during nighttime surrounding the location 64*a* in FIG. 1, lower temperature atmosphere about the outer conduit 24 cools air within the annularly-shaped space 72 above the roof 32. In a length of the coaxial ventilator 20 being cooled by the surrounded atmosphere, as depicted in FIG. 1 by small downwardly directed arrows within the annularly-shaped space 72 above the location 64*b*, cooler air descends while warmer air in the inner conduit 62 above the location 64*a* rises.

At a location along the length of the coaxial ventilator 20 where rising warmer air within the annularly-shaped space 72 meets descending cooler air within the annularly-shaped space 72 such as at the location 64*b*, an exchange of air occurs between the annularly-shaped space 72 and the inner conduit 62 with:
1. cooler descending air flowing through the holes 63 piercing the inner conduit 62 at the location 64*b* into the inner conduit 62; and
2. warmer rising air flowing through the holes 63 piercing the inner conduit 62 at the location 64*b* into the inner conduit 62.

After flowing from the annularly-shaped space 72 into the inner conduit 62, the descending cooler air continues descending within the inner conduit 62 below the location 64*b* while the rising warmer air continues rising within the inner conduit 62 above the location 64*b*. As depicted in FIG. 1, in this way warmer air first rises from the room 46 in the building 22 initially via the annularly-shaped space 72 and subsequently via the inner conduit 62 to exit the coaxial ventilator 20 at the top thereof. Conversely, cooler air initially enters the annularly-shaped space 72 at the flared upper end 42 of the outer conduit 24 to flow downward before entering the room 46 via the inner conduit 62.

The locations 64*a*, 64*b* and 64*c* where holes 63 pierce the inner conduit 62 promote formation of transition zones inside the coaxial ventilator 20 where air flowing in the annularly-shaped space 72 may enter into the inner conduit 62 and conversely. There exists a tendency for exchanges of air to occur between the annularly-shaped space 72 and the inner conduit 62 where the coaxial ventilator 20 passes through the exterior of the building 22 such as at the roof 32. A tendency exists for flow exchanges of air wherever a change in temperature occurs along the length of the coaxial ventilator 20, i.e. where the coaxial ventilator 20 passes from one thermal environment to another thermal environment.

The cover 82 of the coaxial ventilator 20 may be advantageously configured for evaporatively cooling air entering the flared upper end 42 of the outer conduit 24 by including at the bottom thereof, spaced a distance above the flared upper end 42 of the outer conduit 24, a water filled pan 84. The cover 82 preferably also includes a mesh 86 that spans between peripheries of the pan 84 and a dish-shaped top lid 88. Preferably the lid 88 is opaque and reflective to reduce solar heating. The mesh 86 prevents insects from entering the space between the pan 84 and the lid 88 while permitting atmosphere about the flared upper end 42 of the outer conduit 24 to circulate therethrough. A depression 89 in the lid 88, preferably at the center thereof, with a drip hole 90 formed therethrough, best illustrated in FIGS. 13, 15, 17 and 20, permits collecting rain water used for filling the pan 84.

In the illustration of FIG. 2, the building 22 and the coaxial ventilator 20 are identical to those depicted in FIG. 1. The difference between FIGS. 2 and 1 are that the small arrows within the annularly-shaped space 72 and the inner conduit 62 differ from those in FIG. 1 since the small arrows in FIG. 2 depict the path of air as it flows during daytime. The principal difference between nighttime and daytime airflows is that during daytime there is no exchange of air between the annularly-shaped space 72 and the inner conduit 62. Rather, during daytime warmer air rises along the entire length of the annularly-shaped space 72 while cooler air descends along the entire length of the inner conduit 62.

FIGS. 4 and 5 illustrate an alternative embodiment of the present disclosure in which a pair of coaxial ventilators 20a, 20b in accordance herewith ventilate two (2) different rooms 46a, 46b during nighttime operation. Those elements depicted in FIGS. 4 and 5 that are common to the coaxial ventilator 20 depicted in FIGS. 1-3 carry the same reference numeral distinguished by a prime ("'") designation. Lower segments of each of the coaxial ventilators 20a, 20b are juxtaposed with opposite sides of the interior wall 52a'. As illustrated in FIGS. 4 and 5, above the roof 32' the pair of coaxial ventilators 20a, 20b preferably share a single cover 82'.

FIG. 6 illustrates yet another alternative embodiment of the present disclosure located in a multi-story building 22". Those elements depicted in FIG. 6 that are common to the coaxial ventilator 20 depicted in FIGS. 1-3 carry the same reference numeral distinguished by a double prime ("''") designation. The building 22" includes a basement 92 having a heat source 94, i.e. a boiler or other warm appliance, located therein. Radiation and thermal convection within the basement 92 warms the room 46" through the floor 54". As depicted in FIG. 6, a coaxial ventilator 20" extends from the basement 92 upward to a cooler upper room 36". Convection of warmer air via the coaxial ventilator 20" between the basement 92 and the room 36" warms the room 36" while cooler air descends from the room 36" to the basement 92.

FIG. 7 depicts a preferred bell-shaped flaring 98 of the lower end 44 of the outer conduit 24. Preferably, as stated previously the lower end 68 of the inner conduit 62 is recessed slightly above the lower end 44 of the outer conduit 24. As depicted in FIG. 7, the bell-shaped flaring 98, essentially forming a funnel, begins slightly above the lower end 68 of the inner conduit 62 and above the floor 38 of the room 36. The bell-shaped flaring 98 may be advantageously shaped to exploit the Coanda effect both for separating the upward flow of warmer air from the downward flow of cooler air, and for drawing the rising upward flow from a larger horizontal area around the lower end 44 of the outer conduit 24. The funnel formed by the preferred bell-shaped flaring 98 at the lower end 44 reduces drag and turbulence. Formed in this way the bell-shaped flaring 98 establishes a transition zone having a wider space for stabilizing the upward flow of warmer air and downward flow of cooler air and interference between them.

INDUSTRIAL APPLICABILITY

Figure 10:
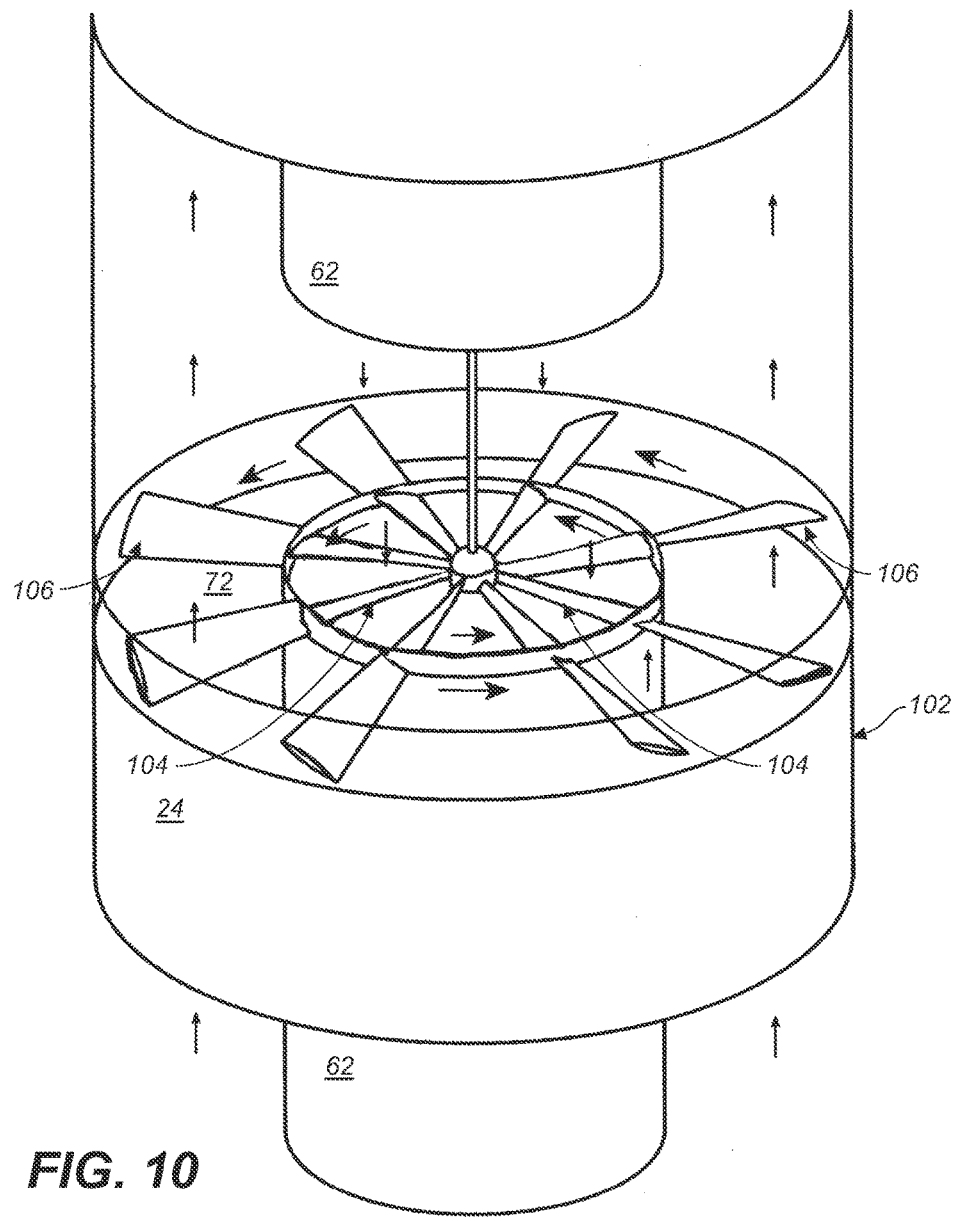
FIG. 10 is a perspective view taken along the line 10-10 in FIG. 9 depicting in greater detail the turbine depicted in FIG. 8.
Figure 12:
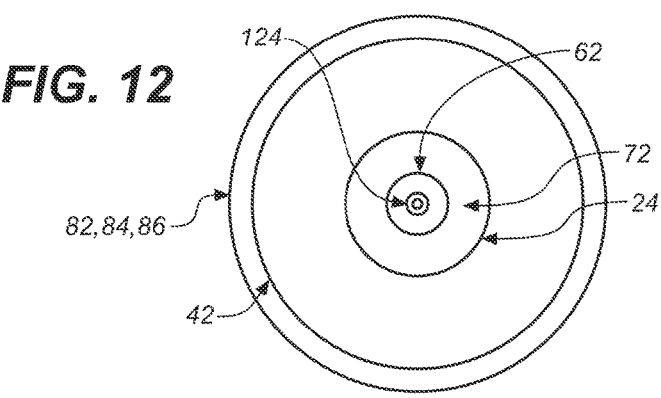
FIG. 12 is a cross-sectional plan view of the thermosyphon cooling tube coaxial ventilator taken along the line 12-12 in FIG. 11.
Figure 11:
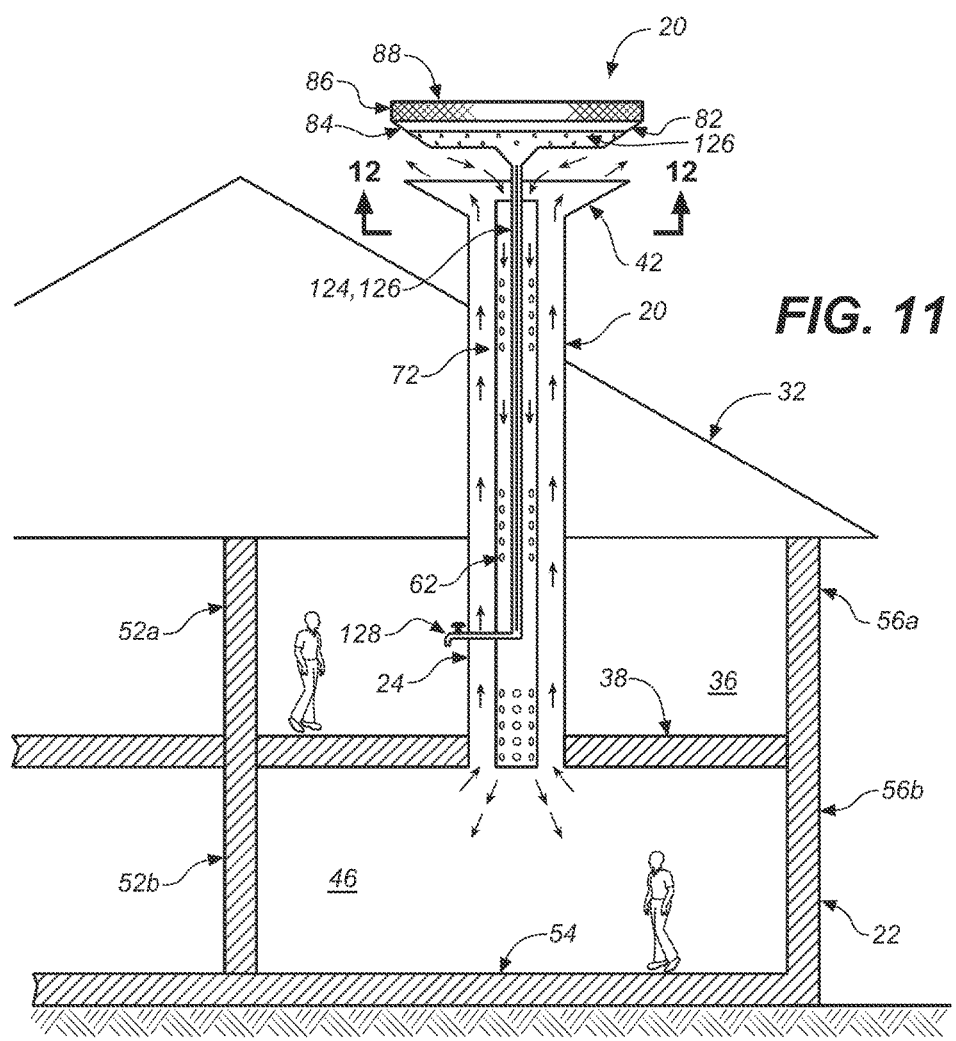
FIG. 11 depicts a cross-sectional, elevational view of a portion of a building having a coaxial ventilator installed therein illustrating an alternative embodiment coaxial ventilator which includes a coaxial liquid-filled thermosyphon cooling tube descending downward from a covered pan for collecting rain water that is located above the building's roof at the top of the alternative embodiment coaxial ventilator and within an inner conduit thereof along a central axis of thereof.
Figure 13:
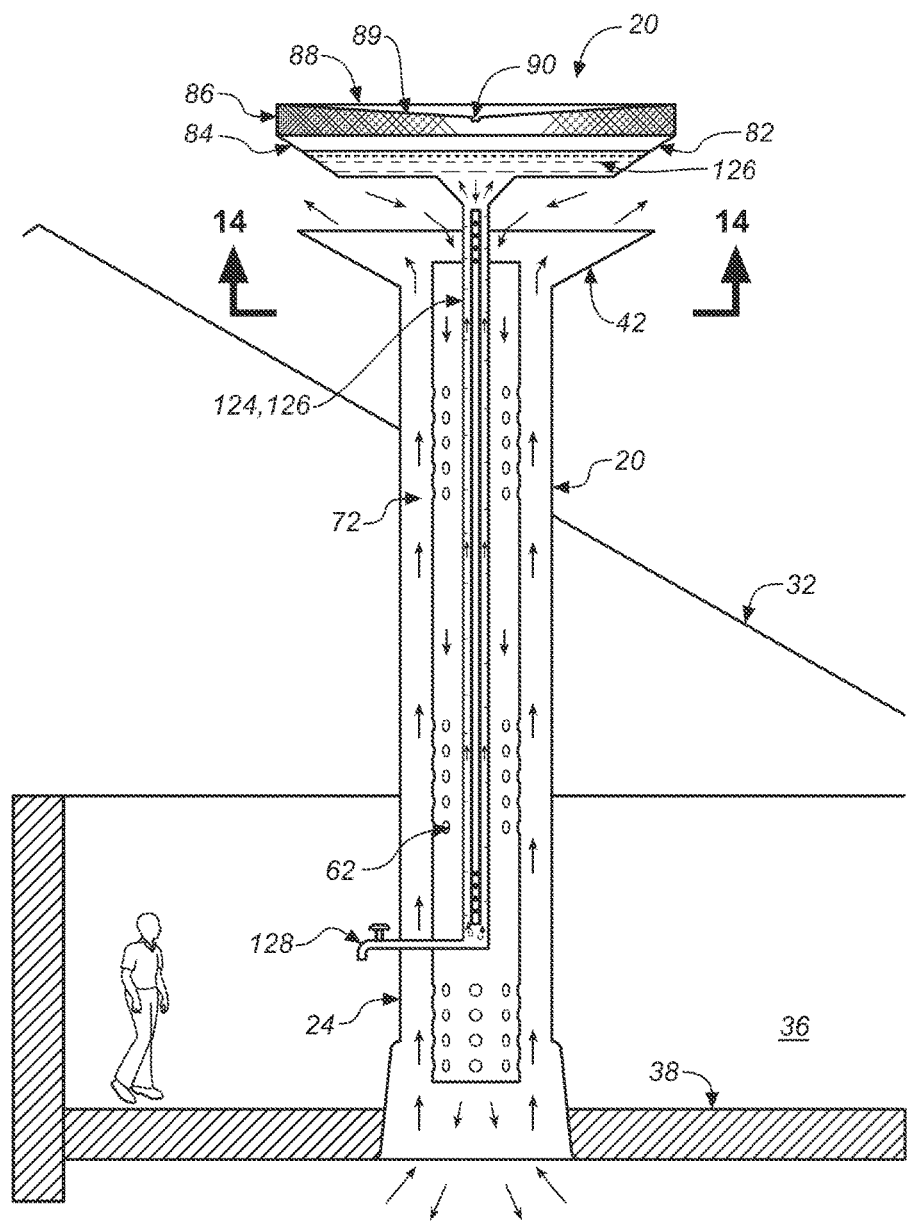
FIG. 13 is an enlarged cross-sectional view of the thermosyphon cooling tube coaxial ventilator depicted in FIG. 11 filled with water from a covered pan located at the top of the thermosyphon cooling tube coaxial ventilator.

FIGS. 8 through 10 illustrate the coaxial ventilator 20 being used advantageously for power production such as generating electricity. In the illustration of FIG. 8, two (2) turbines 102 are located within the coaxial ventilator 20 respectively near the top and bottom thereof. The turbines 102 are located in sections of the coaxial ventilator 20 in which the inner conduit 62 lacks holes 63 and where there is maximum flow and pressure differential to drive the turbines 102. While FIG. 8 depicts only two (2) turbines 102, it is readily apparent that depending upon construction details a single coaxial ventilator 20 may include more or fewer than two (2) turbines 102.

As depicted in FIGS. 9 and 10, inner turbine blades 104 upon which cooler air descending through the inner conduit 62 impinges preferably slant in a direction opposite than outer turbine blades 106 upon which hotter air rising through the annularly-shaped space 72 impinges. Configured in this way, both the descending cooler air and the rising hotter air urge the turbine 102 to rotate in the same direction. Preferably, to advantageously exploit the Coriolis effect the slant direction of the inner turbine blades 104 and the outer turbine blades 106 differs depending upon whether the turbine 102 is located in the Northern Hemisphere or Southern Hemisphere. Advantageously, the slant of the inner turbine blades 104 and the outer turbine blades 106 may change automatically thereby adapting them for differing air flow pressure and velocities occurring throughout the day.

Referring back to FIG. 8, during daylight hours solar heating of air within the room 46 and the outer conduit 24 provides energy for driving the turbines 102 by heating and expanding air therein. The air pressure increase associated with solar heating and expansion enhances the updraft in annularly-shaped space 72 between the outer conduit 24 and the inner conduit 62 before the air escapes from the upper end 42. Note that solar radiation impinging upon the outer conduit 24 heats air within the annularly-shaped space 72. Accordingly, for this particular application it is advantageous to increase the height of the coaxial ventilator 20 that extends above the roof 32. If during night time the air flows within the coaxial ventilator 20 reverse the turbines 102 correspondingly reverse rotation which still provides power for generating electricity.

Rotation of the turbine 102 by hotter air impinging upon the outer turbine blades 106 rotates the inner turbine blades 104 thereby drawing cooler air into the inner conduit 62 to thereby increase the natural descent of cooler air within the inner conduit 62 and compress air within the room 46. After air flow within the coaxial ventilator 20 becomes stable for instance during daytime, the increased flow rates produced by solar heating will be sufficient to overcome any slight back pressure due to increased air pressure within the room 46.

Daytime power production efficiency may be increased by including a non return valve, not illustrated in FIGS. 8-10, at the lower end 68 of the inner conduit 62. Such a non return valve increases daytime efficiencies by preventing reverse flow through the inner conduit 62. However, including such a non return valve also prevents the flow directions within the coaxial ventilator 20 from reversing for producing power during the night.

While less preferred and not illustrated in FIGS. 8-10, the turbines 102 may instead include two (2) independent sets of contra-rotating blades 104, 106 both of which sets slant in the same direction. Because such inner turbine blades 104 and outer turbine blades 106 rotate in opposite directions, generating electricity with a single generator requires coupling the blades 104, 106 together with a mechanical transmission. Alternatively, electricity might be generated using two separate generators respectively coupled independently to the inner turbine blades 104 and to the outer turbine blades 106.

Alternatively, if electricity is supplied to the turbines 102 rather than being drawn therefrom, then the turbines 102 can be used advantageously for boosting air flow through the coaxial ventilator 20.

An alternative embodiment coaxial ventilator 20 depicted in FIGS. 11, 12, 13 and 14 further includes a liquid-filled thermosyphon cooling tube 124 that depends beneath a pan 84 into an inner conduit 62 of the coaxial ventilator 20. In the illustrations of FIGS. 11, 12, 13 and 14, the cooling tube 124 descends along a central axis of the coaxial ventilator 20 to be thereby surrounded by the inner conduit 62. Disposed as depicted in FIGS. 11, 12, 13 and 14, the cooling tube 124 advantageously increases contact area for heat exchange cooling significantly between:

1. water evaporating from a pan 84 located at the top of the coaxial ventilator 20; and
2. air within the coaxial ventilator 20 about the liquid-filled thermosyphon cooling tube 124.

In the embodiment depicted in FIGS. 11, 12, 13 and 14, the cooling tube 124 is filled with water 126 drawn from the pan 84. A drain tap 128 located at the bottom of the cooling tube 124 permits drawing collected rainwater as a backup for supplementary or emergency domestic water supply. The cooling tube 124 is preferably made of copper or similarly high thermal conductivity material, and maybe be finned or corrugated with heat conducting surfaces to increase the surface area for heat exchange, or alternatively be of semi-permeable surfaces to increase the surface area for water evaporation cooling.

Adding a liquid-filled thermosyphon cooling tube 124 that includes a perforated inner return tube, such as that described in U.S. Pat. No. 6,014,968 and hereby incorporated by reference as though fully set forth here, to the coaxial ventilator 20 depicted in FIGS. 1-3 effectively elongates the heat exchange area of the evaporative cooling water-filled pan 84. Effectively elongating the heat exchange area of the evaporative cooling water-filled pan 84 in this way increases cooling capacity of a coaxial ventilator 20 without significantly increasing the overall size of the coaxial ventilator 20. Extending the heat exchange area of the coaxial ventilator 20 by including the thermosyphon cooling tube 124 therein increases heat exchange efficiency between air within the coaxial ventilator 20 and evaporative cooling water-filled pan 84.

The coaxial ventilator 20 depicted in FIGS. 11, 12, 13 and 14 passively, cost effectively, and space efficiently uses evaporating rain water to capture and store nighttime "coolness" for use during mornings and afternoons when it is most needed. During dry weather, any rain water collected in the pan 84 can be augmented by connecting a float valve controlled piped water supply to the upper evaporative cooling water-filled pan 84 (not illustrated in any of the FIGs.). While evaporative cooling occurs continuously throughout an entire day, however temperatures are coolest at night, i.e. over 10 hours of nighttime evaporative cooling on average. Consequently, there exists ample time during that 10 hour interval to cool water in the pan 84 down to nighttime temperatures.

However, holding a sufficient quantity of water both for daytime cooling needs, particularly to store nighttime cooling capacity, and for providing sufficient evaporative heat exchange surface area, requires a quite large, heavy and unwieldy water-filled pan 84 that is located above a building's roof. Frequently, without a large pan 84 there is insufficient thermal storage capacity to extend nighttime "coolness" well into the afternoons, and insufficient heat exchange area to transfer heat into air descending down into the coaxial ventilator 20.

Figure 15:
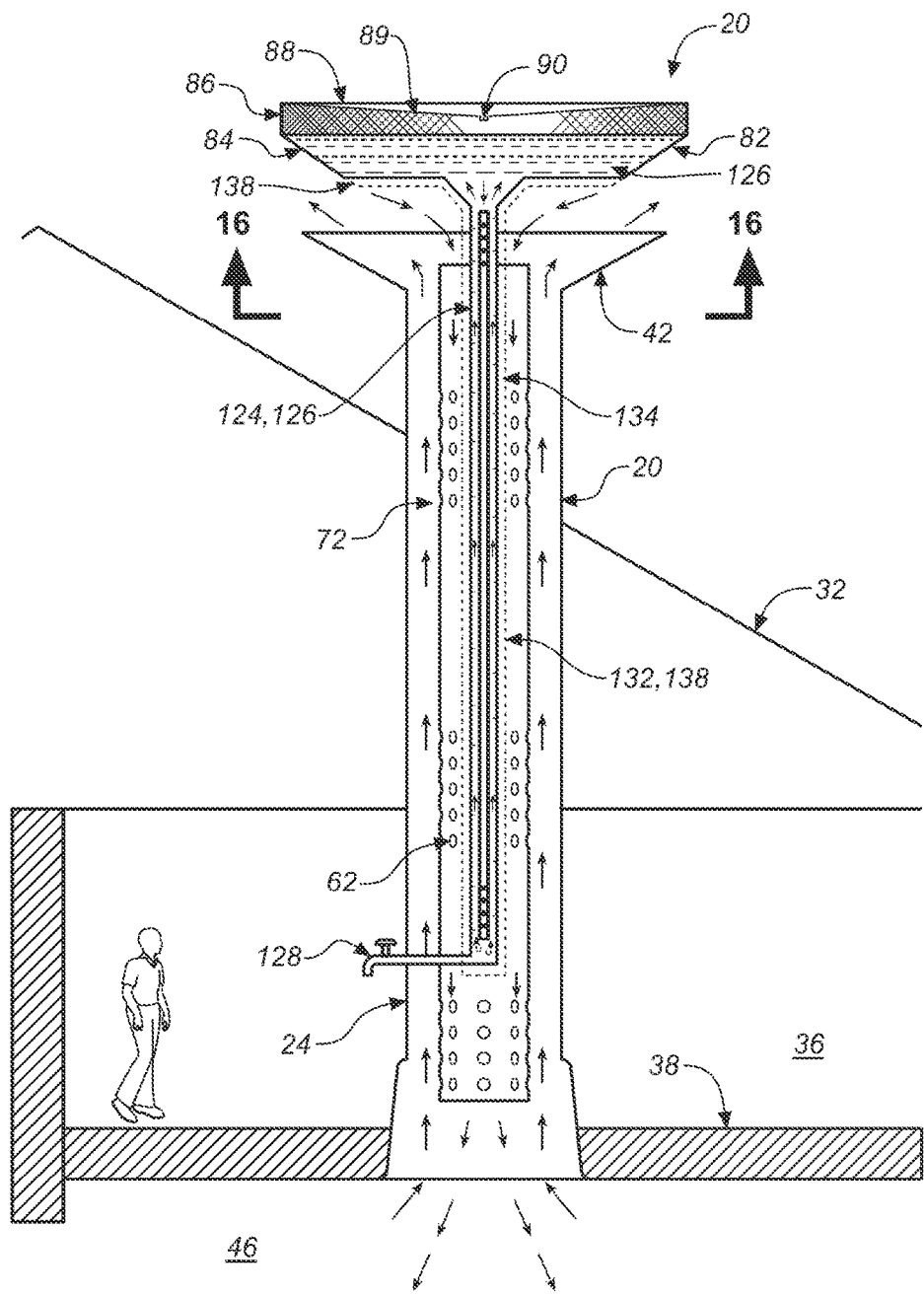
FIG. 15 is an enlarged cross-sectional view of the thermosyphon cooling tube coaxial ventilator illustrated in FIG. 13 depicting an alternative embodiment thereof in which a tube surrounds the coaxial liquid filled cooling tube establishing an annularly-shaped space thereabout that is filled with oil or other liquid that has a specific heat greater than that of water thereby increasing thermal storage capacity of the thermosyphon cooling tube coaxial ventilator.

FIGS. 15 and 16 depict an alternative embodiment of the coaxial ventilator 20 depicted in FIGS. 11, 12, 13 and 14, In the embodiment depicted in FIGS. 15 and 16 the water-filled thermosyphon cooling tube 124 below the pan 84 is surrounded by a tube 132 illustrated by a dashed line in those FIGs. The tube 132:

1. preferably has a circular cross-section;
2. preferably is made of copper or similarly high thermal conductivity material to enhance heat exchange between liquids filling the tube 132 and the cooling tube 124; and
3. may be flexible, finned or corrugated.

The tube 132 establishes an annularly-shaped space 134 around the cooling tube 124 that is preferably filled with oil 138 or other liquid having a specific heat greater than that of water. In this way liquid filling the annularly-shaped space 134 being in close thermal heat exchange contact with the cooling tube 124 increases thermal storage capacity of the coaxial ventilator 20.

As illustrated by dashed lines in FIGS. 15 and 16, the performance of the thermosyphon cooling tube coaxial ventilator 20 illustrated in those FIGs. can be further enhanced by extending the annularly-shaped space 134 along the length of the thermosyphon cooling tube 124 upward and outward beneath the pan 84. This extension of the tube 132 upward and outward permits the liquid having a specific heat greater than that of water to contact the bottom of the pan 84.

In this way the thermosyphon cooling tube coaxial ventilator 20 depicted in FIGS. 15 and 16 having the double layer pan 84 and cooling tube 124 filled on the inside with water 126 that is surrounded by and separated from the liquid that fills the tube 132 and that has a specific heat greater than that of water:

1. permits using a smaller diameter water-filled pan 84; and
2. further increases the cooling storage capacity of the coaxial ventilator 20.

Furthermore, the thermosyphon cooling tube coaxial ventilator 20 depicted in FIGS. 15 and 16 simplifies suspending the coaxial thermosyphon cooling tube coaxial ventilator 20 in comparison with supporting an alternative coaxial ventilator 20 having a larger roof top water-filled pan 84.

While the cooling tube preferably is a thermosyphon cooling tube 124, the inner return tube included in a thermosyphon cooling tube 124 may be omitted although this reduces cooling tube efficiency. If the return tube of the cooling tube 124 is omitted, then its outer tube must:
1. have a larger diameter than that of the cooling tube 124 if the cooling tube is to achieve the same amount of heat transfer; or
2. if of the same outer diameter as the cooling tube 124, have a shorter length than that of the thermosyphon cooling tube 124 and can provide only a lesser amount of heat transfer due to stagnation inefficiencies and inversion layer formation that results from the tube's smaller diameter.

Figure 17:
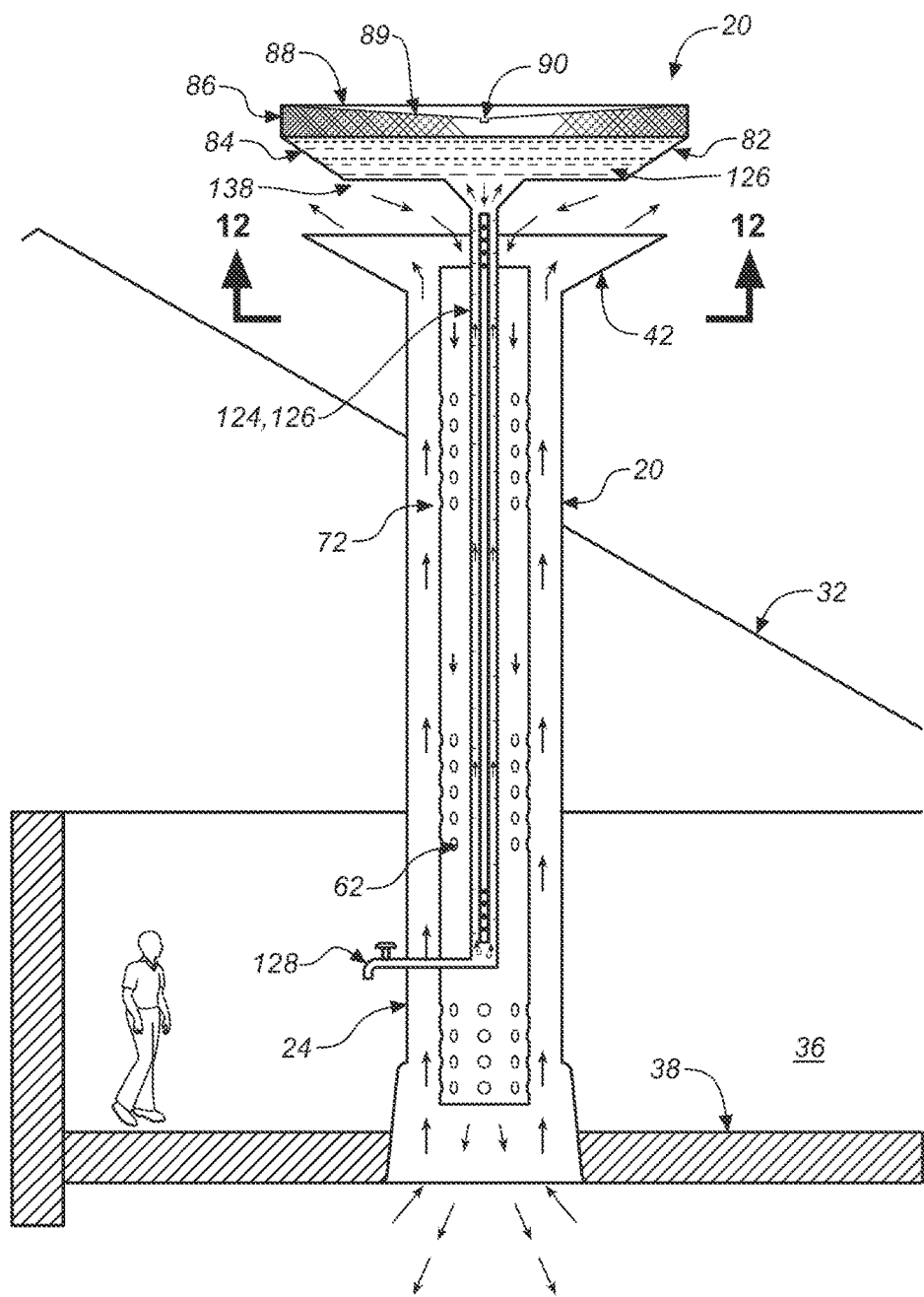
FIG. 17 illustrates an alternative configuration for the thermosyphon cooling tube coaxial ventilator depicted in FIG. 13 in which both the lower portion of the covered pan and the cooling tube are filled with oil rather than water with only the upper portion of the cover pan above the oil being filled with water.

In yet another alternative embodiment of the coaxial ventilator 20 depicted in FIG. 17 the lower portion of the covered pan 84 and the cooling tube 124 are filled with oil 138 rather than water. The cooling tube 124 and the pan 84 are first filled with oil 138 up to approximately half the depth of the pan 84. The pan 84 above the oil is then filled with:
1. rain water collected through the lid 88; or
2. water from a piped supply controlled by a float valve (not illustrated in any of the FIGS.).

In the configuration depicted in FIG. 17, the drain tap 128 is not used for drawing collected rainwater. Rather, the drain tap 128 at the bottom of the cooling tube 124 is now opened only when the oil has to be drained off for servicing the cooling tube 124, or for changing of the oil, probably once every three or four years.

The oil chosen for use in the alternative embodiment depicted in FIG. 17:
1. must be immiscible in water;
2. must be heavier than water;
3. should not evaporate at room temperatures;
4. should remain liquid and free flowing at room and ambient temperatures; and
5. have a much higher specific heat capacity than water.

For such an oil, water in the pan 84 floating on the oil and cooled by evaporation sinks and contacts the oil to thereby cool the oil below.

Layering water for evaporation above oil, with oil extending down into the thermosyphon cooling tube 124 including the inner return tube, increases the cooling capacity of the cooling tube 124 by:
1. using oil to store the "coolness;" while
2. still permitting the water to evaporate and cool the oil below.

And this is done without incurring additional structural cost of a double walled pan 84 and/or a double walled cooling tube as was shown in FIGS. 15 and 16 etc., or other wise having to enlarge the cooling tube and coaxial ventilator 20. For the embodiments of the coaxial ventilator 20 depicted in FIGS. 15 through 17, material forming the cooling tube 124 and the surrounding tube 132 must be impervious so the liquid therein cannot evaporate or leak out.

Figure 19:
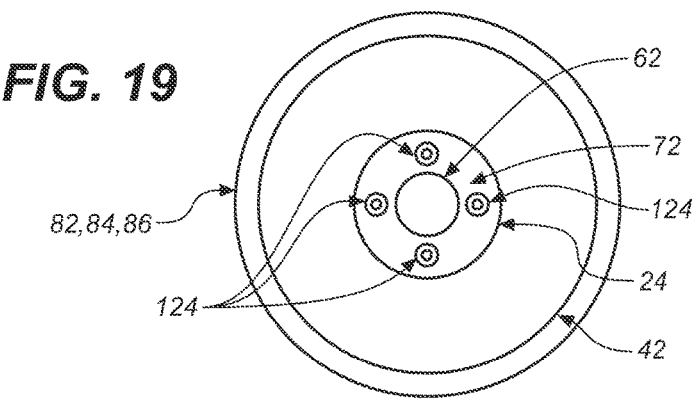
FIG. 19 is a cross-sectional plan view of the thermosyphon multi cooling tube coaxial ventilator taken along the line 19-19 in 18.
Figure 18:
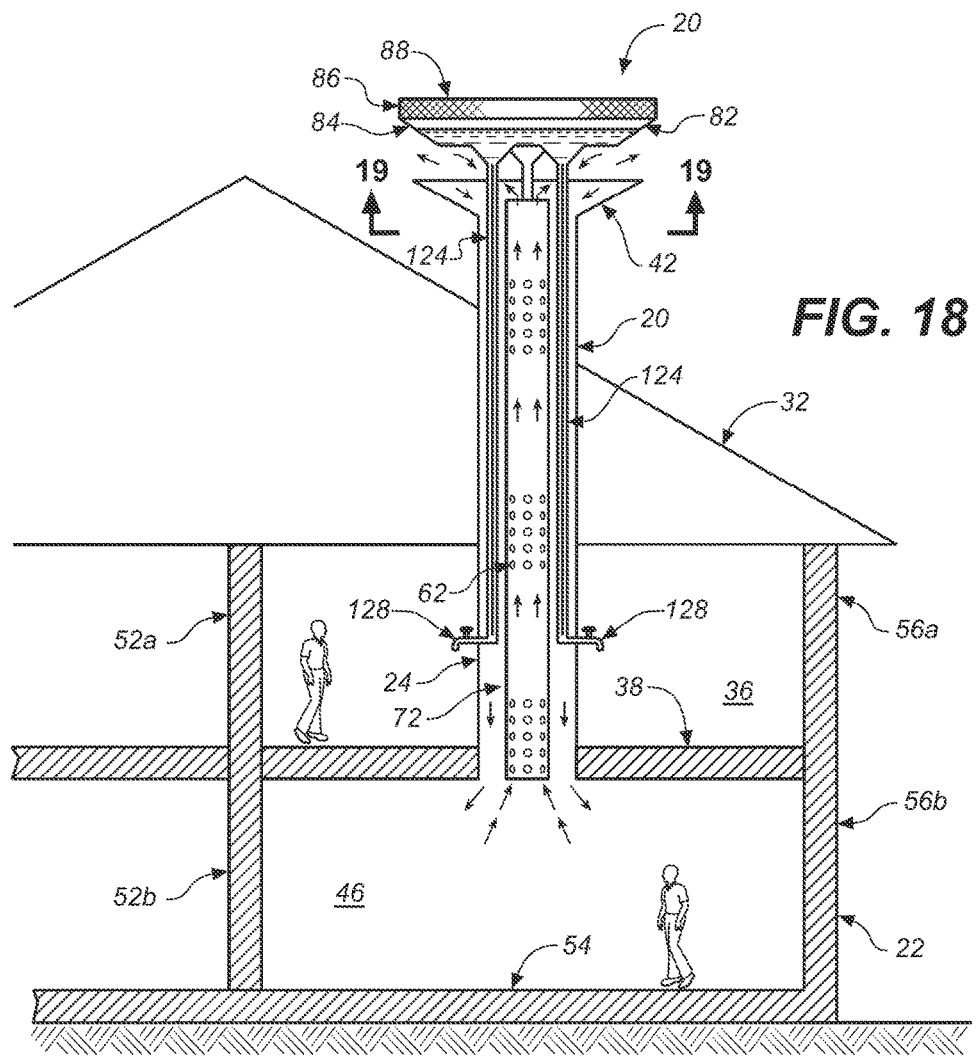
FIG. 18 depicts a cross-sectional, elevational view of a portion of a building having a coaxial ventilator installed therein that illustrates another alternative embodiment coaxial ventilator which includes multiple liquid-filled cooling tubes each of which respectively descends downward from the covered pan into an annularly-shaped space located between the inner conduit and an outer conduit of the coaxial ventilator.

The illustrations of FIGS. 18 and 19 depict yet another alternative embodiment coaxial ventilator 20 which includes multiple liquid-filled cooling tubes 124. Similar to the cooling tube 124 depicted in FIGS. 11 and 12, each of the cooling tubes 124 respectively descends downward from the covered pan 84. However rather than descending along the central axis surrounded by the inner conduit 62, the multiple cooling tubes 124 depicted in FIGS. 18 and 19 descend into an annularly-shaped space 72 located between the inner conduit 62 and an outer conduit 24 of the coaxial ventilator 20. In the embodiment of the coaxial ventilator 20 depicted in FIGS. 18 and 19, the cooling tubes 124 may have the same configuration as any of the various different types of cooling tubes that are described in greater detail above and depicted in FIGS. 11 through FIG. 17.

Figure 20:
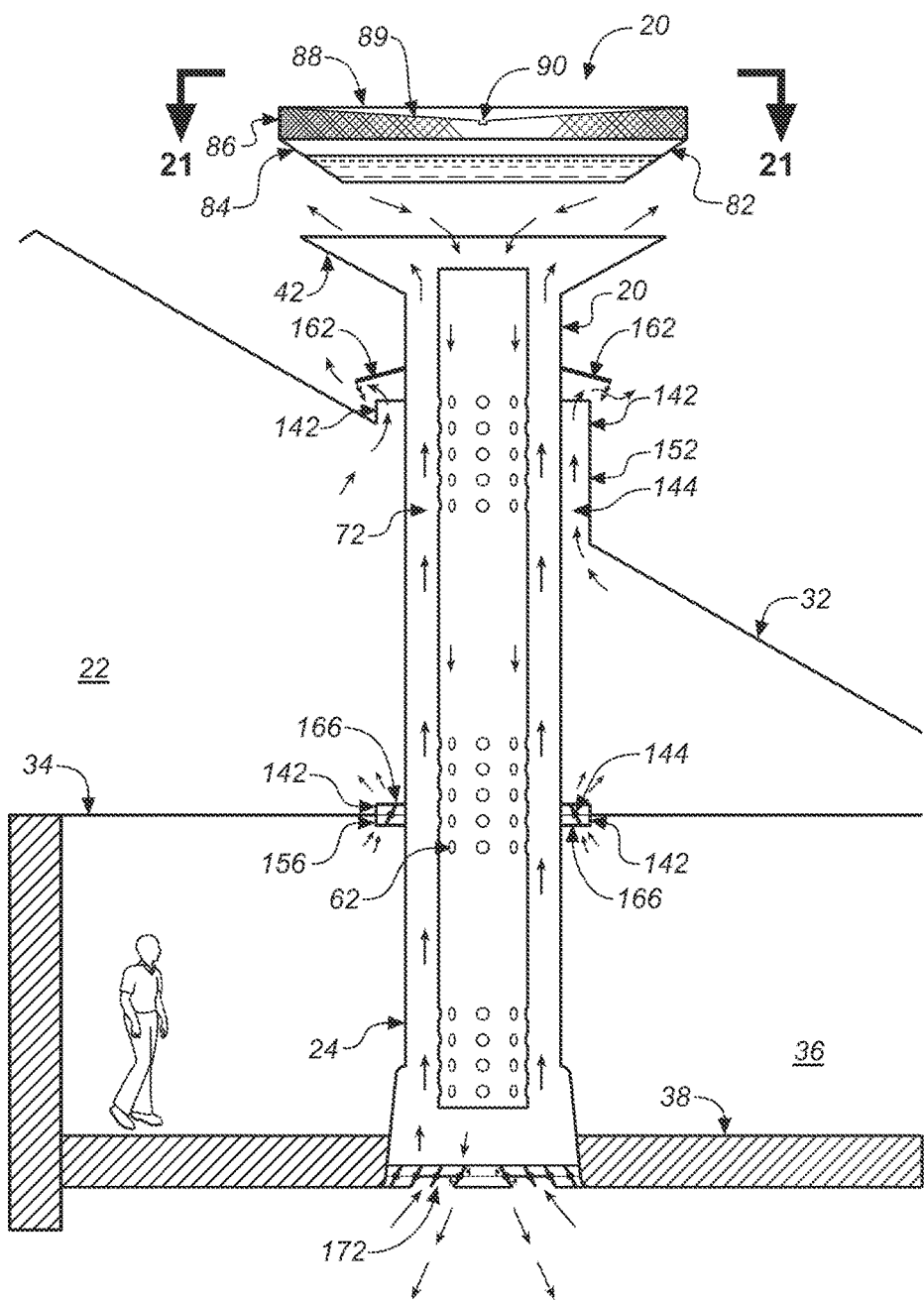
FIG. 20 adds to a copy of FIG. 2 a pair of optional, hollow collar flanges that encircle the coaxial ventilator respectively immediately above the building's roof and also at a ceiling within the building.

Referring now to FIGS. 20 and 21, the outer conduit 24 of the coaxial ventilator 20 depicted in those FIGs. is encircled by a pair of optional, hollow collar flanges 142 respectively located:
1. above the roof 32 of the building 22; and
2. at a ceiling 34 within the building 22 through which the coaxial ventilator 20 passes.

Encircling the outer conduit 24 with the collar flanges 142 establishes an open, annularly-shaped space 144 between the outer conduit 24 and the roof 32 and ceiling 34 respectively about the coaxial ventilator 20. The annularly-shaped spaces 144 facilitate ventilating spaces within the building 22 both below and above each of the collar flanges 142.

At the roof 32, attached to a hole through the roof 32, the collar flange 142 includes a collar flashing 152 that extends upward a distance above the roof 32 sufficient to impede rainwater from splashing from the roof 32 into the annularly-shaped space 144. Because the upper end of the collar flashing 152 is smaller in diameter than the pan 84, the upper opening of the collar flashing 152 about the outer conduit 24 is inherently somewhat shielded from the entry of rainwater. Where the coaxial ventilator 20 penetrates the ceiling 34, the collar flange 142 includes an open annular collar 156 that passes through the ceiling 34 and extends a short distance above and below the ceiling 34.

The upper end of the collar flange 142 extending above the roof 32 preferably includes flap shutters 162 that may be closed both to block airflow through the collar flange 142 and the entry of rainwater thereinto. Correspondingly, the collar flange 142 extending through the ceiling 34 preferably includes dampeners 166 that may be rotated to a closed position to block airflow through the collar flange 142.

Both collar flanges 142 respectively located at the roof 32 and at the ceiling 34 when open provide additional ventilation that reduces any build up or stagnation of warm air about the coaxial ventilator 20 at the roof 32 and the ceiling 34. Including the collar flanges 142 about the coaxial ventilator 20 advantageously keeps the immediate vicinity of the coaxial ventilator 20 cooler thereby improving its efficiency in transferring cool air from the pan 84 to the room 36 below without the air becoming unduly heated.

As illustrated in FIG. 20, the coaxial ventilator 20 depicted in any of the various FIGs. may also include as set of dampeners 172 located at the lower end of the coaxial ventilator 20. In climates which experience both heat in summer and cold in winter, both the shutters 162 and the dampeners 166 as well as the dampeners 172 are left open during summer so hot air can escape from the building 22, and closed in winter to conserve heat within the building 22.

Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following claims be interpreted as encompassing all alterations, modifications, or alternative applications as fall within the true spirit and scope of the disclosure.

What is claimed is:
1. A coaxial ventilator (20) adapted for inclusion in a building (22) for exchanging atmosphere between parts of the building (22) at differing heights thereof, the coaxial ventilator (20) comprising:

a. an outer conduit (24) adapted for being juxtaposed with at least a portion the building (22), the portion being selected from a group consisting of:
   i. a roof (32);
   ii. a floor (38); and
   iii. a wall (52*a*, 52*b*), and
   the outer conduit (24) having a length that extends from an upper end (42) of the outer conduit downward to a lower end (44) of the outer conduit; and
b. an inner conduit (62) surrounded by the outer conduit (24) and extending substantially along the entire length of the outer conduit (24) with an upper end (66) and a lower end (68) of the inner conduit (62) being located near the upper end (42) and lower end (44) of the outer conduit (24),
both the outer conduit (24) and the inner conduit (62) being open to atmosphere surrounding the coaxial ventilator (20) at the respective upper ends (42, 66) and lower ends (44, 68) thereof, and
c. a cover disposed and spaced above the upper end (42) of the outer conduit, the cover being adapted to (i) permit atmosphere to enter through one (1) of two (2) conduits (24, 62), and (ii) hold liquid that may function to cool atmosphere entering through one (1) of two (2) conduits (24, 62) through evaporative cooling;
whereby responsive to temperatures of atmosphere both surrounding and within the outer conduit (24) and the inner conduit (62) simultaneously:
   i. atmosphere about the upper end (42) of the outer conduit (24) enters into one (1) of two (2) conduits (24, 62) selected from a group consisting of:
      A. the outer conduit (24); and
      B. the inner conduit (62); and
   ii. atmosphere within the coaxial ventilator (20) exits into atmosphere about the upper end (42) of the outer conduit (24) from one (1) of two (2) conduits (24, 62) selected from a group consisting of:
      A. the inner conduit (62); and
      B. the outer conduit (24).

2. The coaxial ventilator (20) of claim 1 wherein the inner conduit (62) has at least one (1) hole (63) formed therethrough for allowing an exchange of air between the conduits (24, 62) in at least one (1) location (64*a*, 64*b*, 64*c*) along the length of the outer conduit (24) where a transition in temperature about the outer conduit (24) occurs.

3. The coaxial ventilator (20) of claim 1 wherein the upper end (42) of the outer conduit (24) is locatable above the roof (32) of the building (22), and the coaxial ventilator (20) further comprises a cover (82) disposed above the upper end (42) of the outer conduit (24) that occludes upper ends (42, 66) both of the outer conduit (24) and of the inner conduit (62) thereby preventing precipitation from entering thereinto while simultaneously permitting atmosphere to enter thereinto.

4. The coaxial ventilator (20) of claim 3 wherein the cover (82) includes:
a. a pan (84) spaced a distance above the upper end (42) of the outer conduit (24) so atmosphere about the upper end of the coaxial ventilator (20) may enter thereinto, the pan (84) being adapted for holding liquid (126, 128);
b. a lid (88) spaced a distance above the pan (84); and
c. mesh (86) that spans between peripheries of the pan (84) and the lid (88) for:
   i. barring entry of insects into the cover (82), while
   ii. permitting atmosphere to circulate therethrough, whereby volatile liquid (126, 128) in the pan (84) evaporatively cools atmosphere entering the coaxial ventilator (20).

5. The coaxial ventilator (20) of claim 4 further comprising:
d. at least one (1) cooling tube (124) adapted for filling with liquid (126, 128), the cooling tube (124) depending beneath the pan (84) into at least one (1) of the conduits (24, 62) for advantageously increasing thermal conductivity between:
   i. the pan (84) and contents therein; and
   ii. the conduits (24, 62).

6. The coaxial ventilator (20) of claim 5 wherein the at least one (1) cooling tube (124) is a thermosyphon tube.

7. The coaxial ventilator (20) of claim 5 wherein the at least one (1) cooling tube (124) is semi-permeable for providing a surface area thereon for evaporation cooling.

8. The coaxial ventilator (20) of claim 5 wherein:
a. the at least one (1) cooling tube (124) is coupled to the pan (84);
b. the at least one (1) cooling tube (124) and a lower portion of the pan (84) is filled with a liquid (138) that is:
   i immiscible in water 126; and
   ii. heavier than water 126; and
c. water 126 fills a portion of the pan (84) above the liquid (138).

9. The coaxial ventilator (20) of claim 5 wherein a tube (132) encircles the at least one (1) cooling tube (124) thereby establishing an annularly-shaped space (134) between the cooling tube (124) and the tube (132), the annularly-shaped space (134) being adapted for filling with liquid (126, 128) for bettering cooling by the coaxial ventilator (20).

10. The coaxial ventilator (20) of claim 1 further comprising at least one (1) turbine (102) located in a section thereof in which the inner conduit (62) lacks a hole (63), the turbine (102) being adapted for:
a. in a first configuration extracting power from air flowing through the coaxial ventilator (20); and
b. in a second configuration being energized for boosting air flow through the coaxial ventilator (20).

11. A coaxial ventilator (20) adapted for inclusion in a building (22) for exchanging atmosphere between parts of the building (22) at differing heights thereof, the coaxial ventilator (20) comprising:
a. an outer conduit (24) adapted for being juxtaposed with at least a portion the building (22), the portion being selected from a group consisting of:
   i. a roof (32);
   ii. a floor (38); and
   iii. a wall (52*a*, 52*b*), and the outer conduit (24) having a length that extends from an upper end (42) of the outer conduit downward to a lower end (44) of the outer conduit; and
b. an inner conduit (62) surrounded by the outer conduit (24) and extending substantially along the entire length of the outer conduit (24) with an upper end (66) and a lower end (68) of the inner conduit (62) being located near the upper end (42) and lower end (44) of the outer conduit (24), the inner conduit (62) having at least one (1) hole (63) formed therethrough for allowing an exchange of air between the conduits (24, 62) in at least one (1) location (64*a*, 64*b*, 64*c*) along the length of the outer conduit (24) where a transition in temperature about the outer conduit (24) occurs, both the outer conduit (24) and the inner conduit (62) being open to atmosphere surrounding the coaxial ventilator (20) at the respective upper ends (42, 66) and lower ends (44, 68) thereof, whereby responsive to temperatures of atmosphere both surrounding and within the outer conduit (24) and the inner conduit (62) simultaneously:
  i. atmosphere about the upper end (42) of the outer conduit (24) enters into one (1) of two (2) conduits (24, 62) selected from a group consisting of:
     A. the outer conduit (24); and
     B. the inner conduit (62); and
  ii. atmosphere within the coaxial ventilator (20) exits into atmosphere about the upper end (42) of the outer conduit (24) from one (1) of two (2) conduits (24, 62) selected from a group consisting of:
     A. the inner conduit (62); and
     B. the outer conduit (24); and
  c. a cover disposed and spaced above the upper end (42) of the outer conduit, the cover being adapted to (i) permit atmosphere to enter through one (1) of two (2) conduits (24, 62), and (ii) hold liquid that may function to cool atmosphere entering through one (1) of two (2) conduits (24, 62) through evaporative cooling.

12. The coaxial ventilator (20) of claim 11 wherein the upper end (42) of the outer conduit (24) is locatable above the roof (32) of the building (22), and the coaxial ventilator (20) further comprises a cover (82) disposed above the upper end (42) of the outer conduit (24) that occludes upper ends (42, 66) both of the outer conduit (24) and of the inner conduit (62) thereby preventing precipitation from entering thereinto while simultaneously permitting atmosphere to enter thereinto.

13. The coaxial ventilator (20) of claim 12 wherein the cover (82) includes:
  a. a pan (84) spaced a distance above the upper end (42) of the outer conduit (24) so atmosphere about the upper end of the coaxial ventilator (20) may enter thereinto, the pan (84) being adapted for holding liquid (126, 128);
  b. a lid (88) spaced a distance above the pan (84); and
  c. mesh (86) that spans between peripheries of the pan (84) and the lid (88) for:
     i. barring entry of insects into the cover (82), while
     ii. permitting atmosphere to circulate therethrough, whereby volatile liquid (126, 128) in the pan (84) evaporatively cools atmosphere entering the coaxial ventilator (20).

14. The coaxial ventilator (20) of claim 13 further comprising:
  d. at least one (1) cooling tube (124) adapted for filling with liquid (126, 128), the cooling tube (124) depending beneath the pan (84) into at least one (1) of the conduits (24, 62) for advantageously increasing thermal conductivity between:
     i. the pan (84) and contents therein; and
     ii. the conduits (24, 62).

15. The coaxial ventilator (20) of claim 14 wherein the at least one (1) cooling tube (124) is a thermosyphon tube.

16. The coaxial ventilator (20) of claim 14 wherein the at least one (1) cooling tube (124) is semi-permeable for providing a surface area thereon for evaporation cooling.

17. The coaxial ventilator (20) of claim 14 wherein:
  a. the at least one (1) cooling tube (124) is coupled to the pan (84);
  b. the at least one (1) cooling tube (124) and a lower portion of the pan (84) is filled with a liquid (138) that is:
     i immiscible in water 126; and
     ii. heavier than water 126; and
  c. water 126 fills a portion of the pan (84) above the liquid (138).

18. The coaxial ventilator (20) of claim 14 wherein a tube (132) encircles the at least one (1) cooling tube (124) thereby establishing an annularly-shaped space (134) between the cooling tube (124) and the tube (132), the annularly-shaped space (134) being adapted for filling with liquid (126, 128) for bettering cooling by the coaxial ventilator (20).

19. The coaxial ventilator (20) of claim 11 further comprising at least one (1) turbine (102) located in a section thereof in which the inner conduit (62) lacks the hole (63), the turbine (102) being adapted for:
  a. in a first configuration extracting power from air flowing through the coaxial ventilator (20); and
  b. in a second configuration being energized for boosting air flow through the coaxial ventilator (20).

\* \* \* \* \*